United States Patent [19]

Cillario

[11] Patent Number: 4,787,534

[45] Date of Patent: Nov. 29, 1988

[54] DROPPER MACHINE

[75] Inventor: Lorenzo Cillario, Alba, Italy

[73] Assignee: Ferrero S.p.A., Alba, Italy

[21] Appl. No.: 464,968

[22] Filed: Feb. 8, 1983

[51] Int. Cl.$^4$ .............................................. B67D 5/08
[52] U.S. Cl. ................................... 222/130; 222/275; 184/24
[58] Field of Search .............. 222/275, 276, 265, 255, 222/409, 130; 184/24, 5, 65; 92/153, 86.5; 137/539, 543.17

[56] References Cited

U.S. PATENT DOCUMENTS

| | | | |
|---|---|---|---|
| 1,407,493 | 2/1922 | Stephens | 92/86.5 X |
| 1,971,542 | 8/1934 | Taylor | 184/24 X |
| 2,765,962 | 10/1956 | Perkins | 222/275 X |
| 2,893,078 | 7/1959 | Jahn et al. | 222/275 X |
| 3,622,048 | 11/1971 | Batlas | 222/409 X |
| 4,396,035 | 8/1983 | Maples | 137/539 |

Primary Examiner—Joseph J. Rolla
Attorney, Agent, or Firm—Bernard, Rothwell & Brown

[57] ABSTRACT

A first reservoir is provided for receiving a filling of the substance to be delivered, having a second reservoir superimposed thereon for receiving a filling of a lubricating substance. The reservoirs are traversed by tubular elements communicating at their upper ends with the second reservoir, each having apertures in an intermediate part for putting its interior into communication with the first reservoir and a dropper nozzle at its lower end. A plurality of pistons, each of which is slidable in a respective tubular element with a tolerance such as to achieve sealing without the need for washers, are movable between an upper position, allowing the substance to be delivered to flow into the tubular element, and a lower position causing the lower ends of the pistons to close to the dropper nozzle.

7 Claims, 3 Drawing Sheets

DROPPER MACHINE

The present invention relates to dropper machines for delivering metered quantities of a fluid or semi-fluid substance.

The subject of the present invention is a dropper machine of this type, characterised in that it comprises:

a support framework;

a first reservoir carried by the framework, the first reservoir receiving a filling of the substance to be delivered and having a base wall which lies in a horizontal plane;

a second reservoir carried by the framework and superimposed over the first reservoir, the second reservoir receiving a filling of a lubricant and having a base wall which lies in a horizontal plane;

a plurality of tubular elements with vertical axes which traverse the base walls of the first and second reservoirs, each tubular element having apertures in an intermediate part for putting its interior into communication with the first reservoir adjacent the base wall of the first reservoir, each tubular element having a dropper nozzle at its lower end and communicating at its upper end with the second reservoir adjacent the base wall of the second reservoir;

a plurality of pistons each of which is slidable in a respective tubular element with a tolerance such as to achieve sealing without the need for washers, each piston being movable between an upper position, in which the piston uncovers the apertures in the tubular element and allows the passage of the substance to be delivered into the tubular element, and a lower position in which the end of the piston is close to the dropper nozzle, the movement of the piston from the upper position to the lower position causing the expulsion of a metered quantity of the substance to be delivered through the dropper nozzle and the penetration of the lubricant from the second reservoir into the passage defined by the piston and the inner wall of the tubular element, and actuator means carried by the framework for effecting the axial movement of the pistons within the tubular elements.

By virtue of this characteristic, the dropper machine according to the invention allows the delivery of metered quantities of a fluid or semifluid substance, while preventing the substance to be delivered from rising up from the reservoir in which it is contained into the passage between the piston and the inner wall of the tubular element, obstructing the sliding movement of the piston within the tubular element.

The invention can be used to particular advantage for delivering metered quantities of food products, such as, confectionery products, made from sorbitol which is brought to the liquid state at a temperature of more than 80° C.

Since the sorbitol changes into the solid state upon cooling, its penetration into the aforesaid passage could cause the blockage of the piston within the tubular element and damage to the dropper machine.

The penetration of the substance to be delivered into the said passage could be prevented by providing sealing washers, for example, O-rings, between the piston and the inner wall of the tubular element. These washers would have to be replaced frequently, however, because of their rapid deterioration due to the mechanical and thermal forces to which they are subjected during the operation of the machine.

The fit of the piston in its tubular element with a tolerance such as to achieve sealing without the need for washers is thus essential to the present invention.

The invention will now be described, purely by way of non-limiting example, with reference to the appended drawings, in which.

Figure 1:
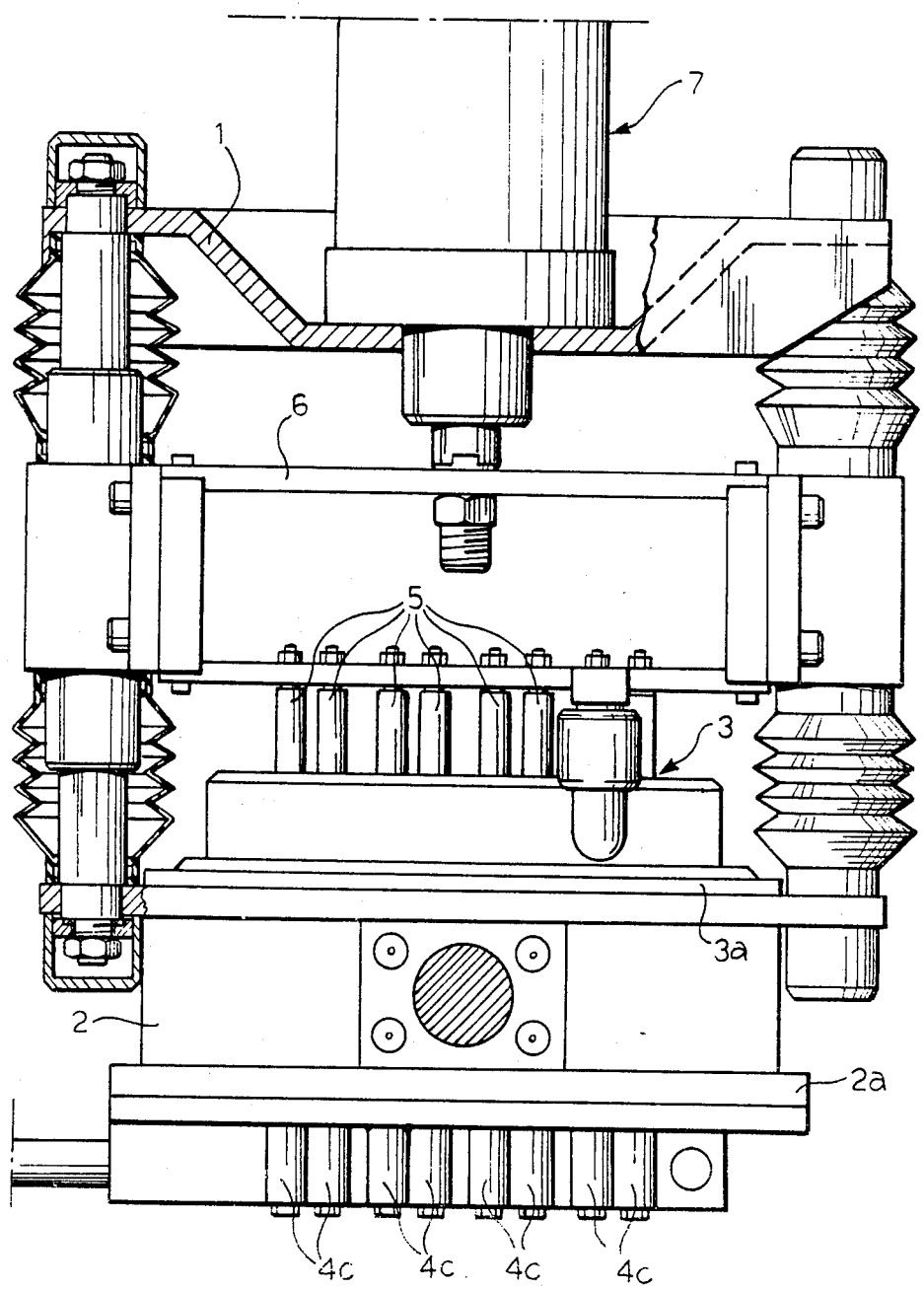
FIG. 1 is a partially sectioned and cut-away elevational view of a dropper machine according to the invention.
Figure 2:
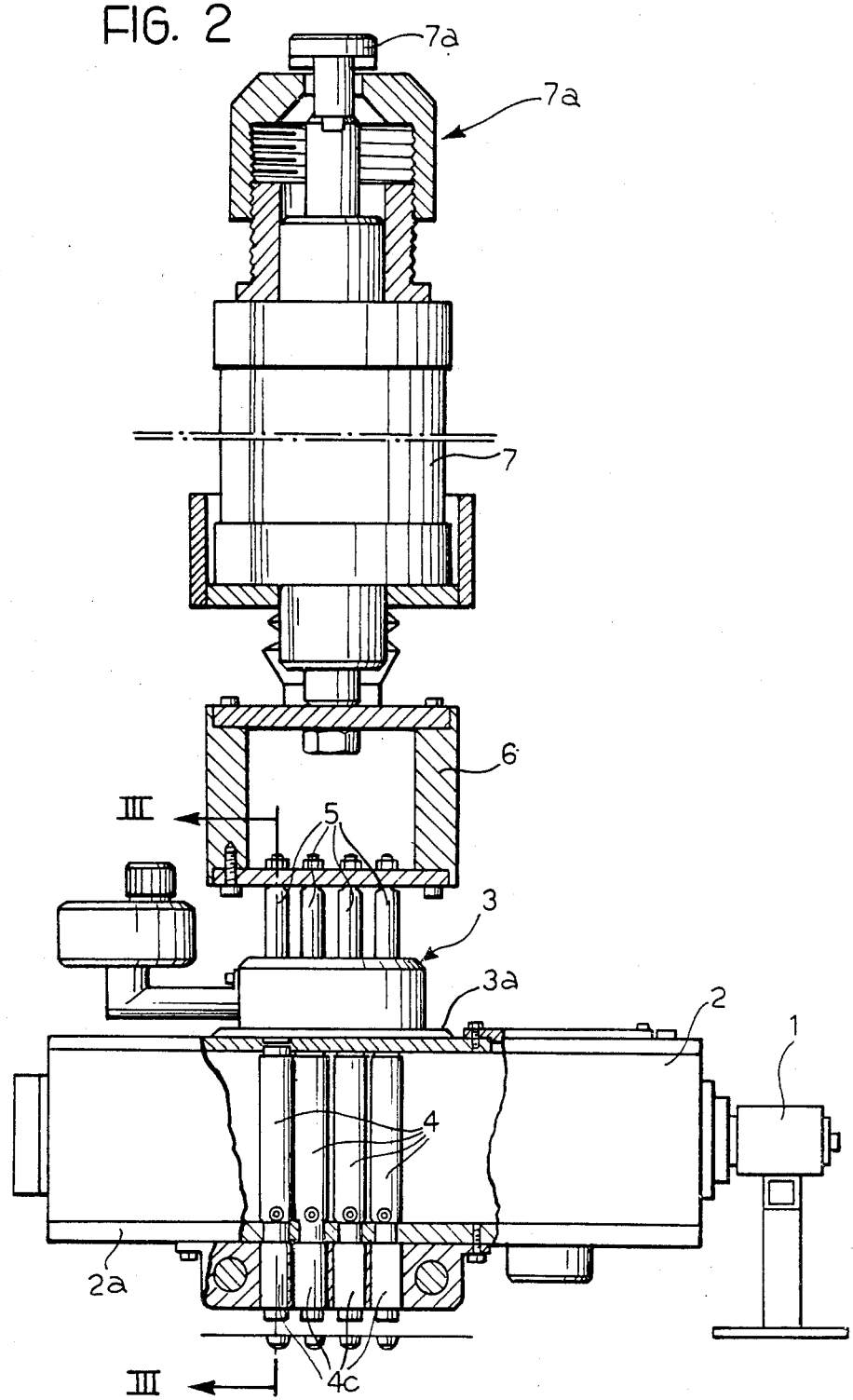
FIG. 2 is an elevational view of the machine taken from a different aspect of FIG. 1, in which several parts have been omitted for simplicity.

FIGS. 1 and 2 show a support framework 1 (not illustrated in its entirety) which supports a first reservoir 2 for receiving a filling of substance to be delivered, for example, a fluid or semi-fluid food product such as sorbitol heated to a temperature above its melting point.

The first reservoir 2 has a base wall 2a lying in a horizontal plane.

A second reservoir 3 is superimposed over the first reservoir 2 and receives a filling of a lubricant, for example, glycerine, and has a base wall 3a lying in a horizontal plane.

The base walls 2a, 3a of the first reservoir 2 and the second reservoir 3 are traversed by a plurality of tubular elements 4 with vertical axes.

A respective piston 5 is slidable within each tubular element 4. The upper ends of the pistons 5 are connected to a slide 6 which can reciprocate vertically under the action of a linear actuator 7 connected at its upper end 7a to the support framework 1 (not illustrated in its entirety) of the dropper machine.

Figure 3:
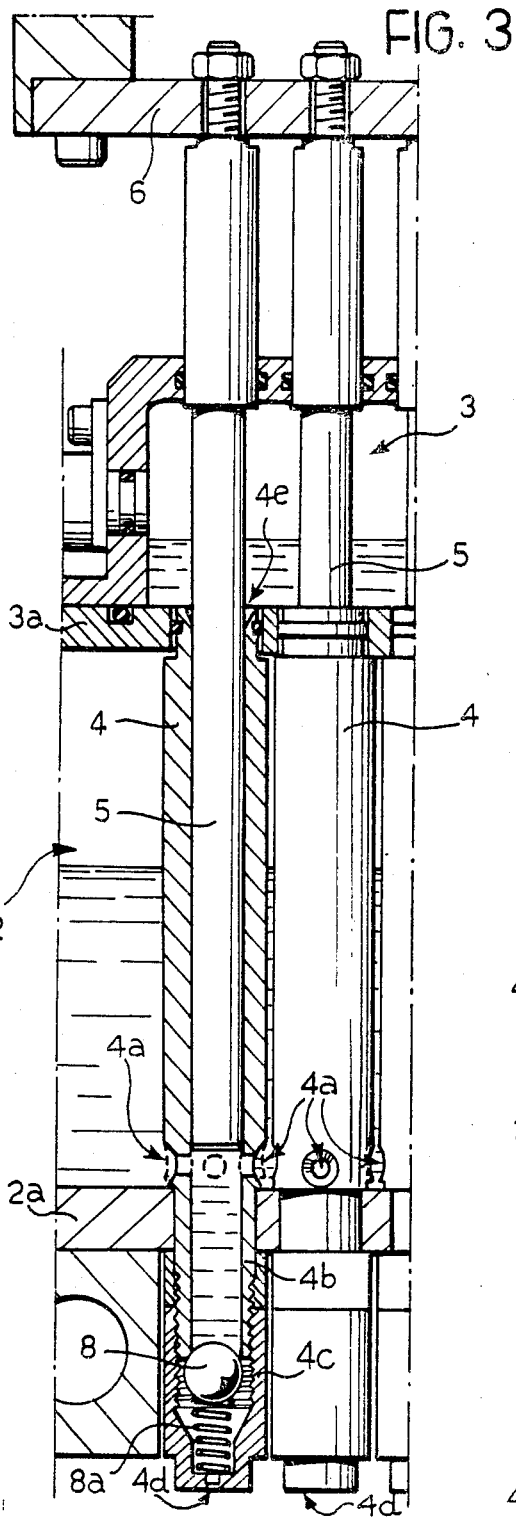
FIG. 3 is a partially sectioned view taken on the line III—III of FIG. 1.
Figure 4:
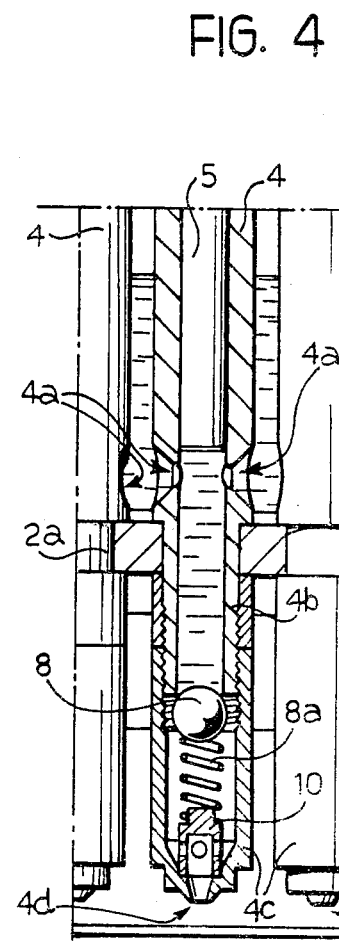
FIG. 4 shows a variant of the lower part of FIG. 3.

As is best seen in FIG. 3 and FIG. 4, each tubular element 4 has apertures 4a in an intermediate portion, which put its interior into communication with the first reservoir 2 adjacent its base wall 2a.

The lower portion 4b of each tubular element projects beneath the base wall 2a and has external threading on which is screwed a cup-shaped body 4c the base wall of which has a shaped central hole 4d constituting a dropper nozzle.

Each of the pistons 5 is slidable within a respective tubular element 4 with a tolerance such as to achieve sealing without the need for washers.

Each piston is movable, as a result of the displacement of the slide 6, between an upper position in which the piston uncovers the apertures 4a in the tubular element and allows the passage of the substance to be delivered into the tubular element 4, and a lower position in which the lower end of the piston is close to the dropper nozzle 4d.

The movement of the piston from the upper position to the lower position causes the expulsion of a metered quantity of substance to be delivered through the dropper nozzle 4d.

Each tubular element 4 has a flared mouth 4e at its upper end which facilitates the penetration of the lubricant from the second reservoir 3 into the passage between the piston 5 and the inner wall of the tubular element 4.

The arrangement is such that the penetration of the lubricant into this passage is facilitated by the movement of the piston 5, which prevents the substance to be delivered, contained in the tubular element, from rising up through the passage to obstruct the sliding of the piston and possibly cause a blockage of the piston 5 within the tubular element 4, as a result of the solidification of the substance to be delivered in the passage.

The cup-shaped body 4c houses a ball 8 which is pressed against the mouth of the lower portion of the tubular element 4 by spring 8a interposed between the ball and the bottom of the cup-shaped body.

The distance between the mouth of the lower portion of the tubular element and the bottom of the cup-shaped body 4c may be varied, by screwing or unscrewing the cup-shaped body, in order to adjust the force exerted by the spring 8a on the ball 8.

The ball 8 prevents the substance to be delivered, which is in the tubular element 4, from flowing through the nozzle 4d under gravity.

The presence of this ball 8, which is pressed by the spring 8a against the mouth of the lower portion of the tubular element 4, promotes the formation of a vacuum within the lower portion of the tubular element as a result of the movement of the piston 5 from the lower position, in which its lower end is close to the dropper nozzle 4d, to the upper position in which the apertures 4a are uncovered to allow the passage of the substance to be delivered into the tubular element 4.

The presence of the vacuum facilitates this passage and avoids incomplete refilling or the formation of air bubbles.

In the embodiment illustrated in FIG. 4, a collar element 10 with radial holes for the passage of the substance to be delivered is associated with the shaped central hole 4d which acts as the dropper nozzle. The collar 10, against the upper part of which bears the spring 8a, acts as means for stopping the movement of the ball 8 to prevent the ball obstructing the dropper nozzle by being thrust against the central hole 4d by the substance to be delivered which leaves the lower mouth of the tubular element 4.

The arrangement illustrated in FIG. 4 is usable to particular advantage for the delivery of dense or viscous substances.

I claim:

1. Dropper machine for delivering metered quantities of a fluid or semi-fluid substance, comprising
   a support framework;
   a first reservoir carried by the framework, said first reservoir receiving a filling of the substance to be delivered and having a base wall lying in a horizontal plane;
   a second reservoir carried by the framework and superimposed over the first reservoir, said second reservoir receiving a filling of a lubricant and having a base wall lying in a horizontal plane;
   a plurality of tubular elements with vertical axes which traverse the base walls of the first and second reservoirs, each tubular element having apertures in an intermediate part for putting its interior into communication with the first reservoir adjacent the base wall of the first reservoir, each tubular element having a dropper nozzle at its lower end and communicating at its upper end with the second reservoir adjacent the base wall of the second reservoir, wherein the upper end of each tubular element has a flared mouth which facilitates the penetration of the lubricant into said passage;
   a plurality of pistons each of which is slidable in a respective tubular element with a tolerance such as to achieve substantial sealing without the need for washers, each piston being movable between an upper position, in which the piston uncovers the apertures in the tubular element and allows the passage of the substance to be delivered into the tubular element, and a lower position in which the lower end of the piston is close to the dropper nozzle, the movement of the piston from the upper position to the lower position causing the expulsion of a metered quantity of the substance to be delivered through the dropper nozzle and the penetration of the lubricant from the second reservoir into the passage defined by the piston and the inner wall of the tubular element; and
   actuator means carried by the framework for effecting the axial movements of the pistons within the tubular elements.

2. Dropper machine according to claim 1, wherein to the lower portion of each tubular element is connected to a cup-shaped body constituting the dropper nozzle, the bottom of which has a shaped central hole through which the fluid or semi-fluid substance is delivered, and wherein the dropper nozzles have associated valve means which prevent the substance to be delivered, which is in the tubular element, from flowing through the nozzle under gravity, and the valve means promoting the formation of a vacuum within the tubular element due to the movement of the piston from the lower position to the upper position.

3. Dropper machine according to claim 2, wherein the valve means include a ball movable within the cup-shaped body and a spring interposed between the ball and the bottom of the cup-shaped body, the spring pressing the ball against the mouth of the lower portion of the tubular element.

4. Dropper machine according to claim 3, including adjustment means for varying the distance between the mouth of the lower portion of the tubular element and the bottom of the cup-shaped body, in order to adjust the force exerted by the spring on the ball.

5. Dropper machine according to claim 3, wherein the shaped central hole has means for stopping the movement of the ball to prevent the ball from obstructing the dropper nozzle.

6. Dropper machine for delivering metered quantities of a fluid or semi-fluid substance, comprising
   a support framework;
   a first reservoir carried by the framework, said first reservoir receiving a filling of the substance to be delivered and having a base wall lying in a horizontal plane;
   a second reservoir carried by the framework and superimposed over the first reservoir, said second reservoir receiving a filling of a lubricant and having a base wall lying in a horizontal plane;
   a plurality of tubular elements with vertical axes which traverse the base walls of the first and second reservoirs, each tubular element having apertures in an intermediate part for putting its interior into communication with the first reservoir adjacent the base wall of the first reservoir, each tubular element communicating at its upper end with the second reservoir adjacent the base wall of the second reservoir, the upper end of each tubular element having a flared mouth;

a cup-shaped dropper nozzle connected to the lower portion of each tubular element, the dropper nozzle including a central hole through which the fluid or semi-fluid substance is delivered;

a plurality of pistons each of which is slidable in a respective tubular element with a tolerance such as to achieve substantial sealing without the need for washers, each piston being movable between an upper position, in which the piston uncovers the apertures in the tubular element and allows the passage of the substance to be delivered into the tubular element, and a lower position in which the lower end of the piston is close to the dropper nozzle, the movement of the piston from the upper position to the lower position causing the expulsion of a metered quantity of the substance to be delivered through the dropper nozzle and the penetration of the lubricant from the second reservoir into the passage defined by the piston and the inner wall of the tubular element;

valve means which prevent the substance to be delivered, which is in the tubular element, from flowing through the nozzle under gravity, the valve means promoting the formation of a vacuum within the tubular element due to the movement of the piston from the lower position to the upper position, the valve means including a ball movable within the cup-shaped body and a spring interposed between the ball and the bottom of the cup-shaped body, the spring pressing the ball against the mouth of the lower portion of the tubular element;

adjustment means for varying the distance between the mouth of the lower portion of the tubular element and the bottom of the cup-shaped body, in order to adjust the force exerted by the spring on the ball;

means for stopping the movement of the ball to prevent the ball from obstructing the shaped central hole of the dropper nozzle, the means including a spring bearing collar interposed between the spring and the bottom of the cup-shaped body, the collar including a radial hole for the passage of the substance to be delivered to the shaped central hole; and actuator means carried by the framework for effecting the axial movements of the pistons within the tubular elements.

7. Dropper machine for delivering metered quantities of a liquified substance which is substantially solid at ambient temperatures, comprising a support framework;

a first reservoir carried by the framework, said first reservoir having a base wall lying in a horizontal plane, the first reservoir receiving a filling of the liquified substance to be delivered, said substance to be delivered being substantially solid at ambient temperatures;

a second reservoir carried by the framework having a base wall lying in a horizontal plane and being superimposed over the first reservoir, said second reservoir receiving a filling of a lubricating and sealing substance;

a plurality of tubular elements with vertical axes which traverse the base walls of the first and second reservoirs, each tubular element having apertures in an intermediate part for putting its interior into communication with the first reservoir adjacent the base wall of the first reservoir, each tubular element communicating at its upper end with the second reservoir adjacent the base wall of the second reservoir, the upper end of each tubular element having a flared mouth;

a cup-shaped dropper nozzle connected to the lower portion of each tubular element, the dropper nozzle including a central hole through which the fluid or semi-fluid substance is delivered;

a plurality of pistons each of which is slidable in a respective tubular element with a tolerance such as to achieve substantial sealing without the need for washers, each piston being movable between an upper position, in which the piston uncovers the apertures in the tubular element and allows the passage of the substance to be delivered into the tubular element, and a lower position in which the lower end of the piston is close to the dropper nozzle, the movement of the piston from the upper position to the lower position causing the explusion of a metered quantity of the substance to be delivered through the dropper nozzle and the penetration of the lubricating and sealing substance from the second reservoir into the passage defined by the piston and the inner wall of the tubular element, said lubricating and sealing substance preventing penetration of the substance to be delivered into the passage defined by the piston and the inner wall of the tubular element;

valve means which prevent the substance to be delivered, which is in the tubular element, from flowing through the nozzle under gravity, the valve means promoting the formation of a vacuum within the tubular element due to the movement of the piston from the lower position to the upper position, the valve means including a ball movable within the cup-shaped body and a spring interposed between the ball and the bottom of the cup-shaped body, the spring pressing the ball against the mouth of the lower portion of the tubular element;

adjustment means for varying the distance between the mouth of the lower portion of the tubular element and the bottom of the cup-shaped body, in order to adjust the force exerted by the spring on the ball;

means for stopping the movement of the ball to prevent the ball from obstructing the shaped central hole of the dropper nozzle, the means including a spring bearing collar interposed between the spring and the bottom of the cup-shaped body, the collar including a radial hole for the passage of the substance to be delivered to the shaped central hole; and actuator means carried by the framework for effecting the axial movements of the pistons within the tubular elements.

* * * * *